United States Patent
Hamacher et al.

(10) Patent No.: US 12,359,852 B2
(45) Date of Patent: Jul. 15, 2025

(54) LUBRICANT RESERVOIR, COMPRESSOR SYSTEM AND HEAT PUMP

(71) Applicant: SPH Sustainable Process Heat GmbH, Overath (DE)

(72) Inventors: Tim Hamacher, Neunkirchen-Seelscheid (DE); Andreas Mück, Bergisch Gladbach (DE)

(73) Assignee: SPH Sustainable Process Heat GmbH, Bergisch Gladbach (DE)

( * ) Notice: Subject to any disclaimer, the term of this patent is extended or adjusted under 35 U.S.C. 154(b) by 0 days.

(21) Appl. No.: 18/094,220

(22) Filed: Jan. 6, 2023

(65) Prior Publication Data

US 2023/0141537 A1    May 11, 2023

Related U.S. Application Data

(63) Continuation of application No. PCT/EP2021/068696, filed on Jul. 6, 2021.

(30) Foreign Application Priority Data

Jul. 7, 2020  (DE) ............... 10 2020 117 899.9

(51) Int. Cl.
*F04B 53/18* (2006.01)
*F16N 39/02* (2006.01)
(Continued)

(52) U.S. Cl.
CPC ............ *F25B 31/002* (2013.01); *F04B 53/18* (2013.01); *F16N 39/02* (2013.01); *F16N 39/04* (2013.01)

(58) Field of Classification Search
CPC ........... F16N 39/04; F16N 39/02; F04B 53/18
(Continued)

(56) References Cited

U.S. PATENT DOCUMENTS

| 320,308 A | 6/1885 | Suckert |
| 1,528,666 A * | 3/1925 | Friedmann ............. F16N 39/04 |
| | | 184/104.1 |

(Continued)

FOREIGN PATENT DOCUMENTS

| CH | 313859 A | 5/1956 |
| CH | 676035 A5 | 11/1990 |

(Continued)

OTHER PUBLICATIONS

International Search Report and Written Opinion for Application No. PCT/EP2021/068696, dated Oct. 21, 2021, 18 pages.

(Continued)

*Primary Examiner* — Henry Y Liu
*Assistant Examiner* — Mark K Buse
(74) *Attorney, Agent, or Firm* — Wood Herron & Evans LLP

(57) ABSTRACT

A lubricant reservoir for a compressor, which can be part of a system of a heat pump, in particular, a high-temperature heat pump, having a holding chamber for lubricants with at least one holding-chamber cladding element at least partially outwardly limiting the holding chamber, and a temperature controller is integrated into the holding-chamber cladding element and/or arranged on it, wherein a heating and/or cooling medium can flow through the temperature controller, which may achieve an improved life cycle assessment in such a lubricant reservoir compared to the known systems, reduce the production or assembly effort, and enable lubricant cooling and lubricant heating.

3 Claims, 2 Drawing Sheets

(51) Int. Cl.
*F16N 39/04* (2006.01)
*F25B 31/00* (2006.01)

(58) Field of Classification Search
USPC .............................................. 184/104.1, 106
See application file for complete search history.

(56) References Cited

U.S. PATENT DOCUMENTS

| | | | |
|---|---|---|---|
| 2,139,996 A | | 12/1938 | Buchanan |
| 2,684,579 A | * | 7/1954 | Hieatt ................... F25B 31/002 |
| | | | 62/468 |
| 4,208,883 A | * | 6/1980 | Stirling .................. G05D 24/02 |
| | | | 62/472 |
| 5,694,780 A | * | 12/1997 | Alsenz .................. F04B 39/064 |
| | | | 62/505 |
| 6,058,898 A | * | 5/2000 | Freese, V .......... F01M 11/0004 |
| | | | 123/196 AB |
| 7,637,337 B2 | * | 12/2009 | Stranges ............ F01M 11/0004 |
| | | | 180/69.1 |
| 9,016,356 B2 | * | 4/2015 | Hollweck .............. F01M 5/002 |
| | | | 165/157 |
| 10,344,639 B1 | * | 7/2019 | Nickols ................. F02F 7/0043 |
| 2008/0314572 A1 | * | 12/2008 | Hommes ................ F01M 5/002 |
| | | | 184/104.1 |
| 2011/0147128 A1 | * | 6/2011 | Schrade ............. F01M 11/0004 |
| | | | 264/40.3 |
| 2012/0186554 A1 | * | 7/2012 | Goerend ............. F16H 57/0452 |
| | | | 123/196 R |
| 2015/0159919 A1 | | 6/2015 | Sato et al. |
| 2015/0184562 A1 | * | 7/2015 | Sato ................... F01M 11/0004 |
| | | | 184/106 |
| 2015/0345844 A1 | | 12/2015 | Köster et al. |
| 2020/0271014 A1 | * | 8/2020 | Gebhard ............ F01M 11/0004 |

FOREIGN PATENT DOCUMENTS

| | | |
|---|---|---|
| CN | 1249809 A | 4/2000 |
| CN | 111059798 A | 4/2020 |
| DE | 3002776 A1 | 8/1981 |
| DE | 9208890 U1 | 11/1993 |
| DE | 102011086476 A1 | 4/2013 |
| DE | 112014001139 T5 | 11/2015 |
| DE | 102015121583 A1 | 6/2017 |
| FR | 2482274 A1 | 11/1981 |
| JP | 59105981 A | 6/1984 |
| JP | 2011012580 A | 1/2011 |
| JP | 2013234796 A | 11/2013 |
| WO | 1997/20177 A1 | 6/1997 |
| WO | 2000/22358 A1 | 4/2000 |
| WO | 2020113152 A2 | 6/2020 |

OTHER PUBLICATIONS

DE102020117899.9 Search Report dated Nov. 12, 2020.
Japanese Application No. 2023-501363 Office Action.
Chinese Application No. 202180048876.1 Office Action dated Apr. 23, 2025.

* cited by examiner

LUBRICANT RESERVOIR, COMPRESSOR SYSTEM AND HEAT PUMP

CROSS-REFERENCE TO RELATED APPLICATIONS

This application is a continuation under 35 U.S.C. § 120 of co-pending International Patent Application no. PCT/EP2021/068696 filed Jul. 6, 2021, and claims benefit under 35 U.S.C. § 119(a)-(d) to German Patent Application no. 10 2020 117 899.9 filed Jul. 7, 2020, all of which are hereby incorporated by reference in its entirety as part of the present disclosure.

FIELD OF THE INVENTION

The present disclosure relates to a lubricant reservoir, such as for a compressor system of a heat pump, including but not limited to a high temperature heat pump.

BACKGROUND

Heat pumps are used, for example, to absorb thermal energy from a first external medium (e.g., ambient air or liquids) using technical or mechanical effort, thereby transferring it to a second external medium as useful energy or useful heat in addition to the drive energy used. The second external medium is a medium to be heated. When implementing such a system in a geothermal plant, the first external medium of liquids contained in the ground or rock can be provided, but, in industrial processes, waste heat can also serve as the first external medium.

Currently, heat pumps are commonly used for heating buildings. However, application of heat pumps to generate heat required for industrial processes are also known. For industrial processes, high-temperature heat pumps with media temperatures of >100° C. are often used.

DE 10 2011 086 476 A1 describes basic heat pump principles using the example of a high-temperature heat pump. The heat pump comprises a fluid circuit for absorbing thermal energy via the fluid and from at least one first reservoir using technical effort and for discharging thermal energy via the fluid to at least one second reservoir for heating the at least one second reservoir.

In addition to an evaporation unit (evaporator), a condensation unit (condenser), and an expansion unit (e.g., expansion tank), heat pumps (including high-temperature heat pumps) comprise a compression unit (compressor) for compressing a working medium circulating in a fluid circuit as a standard. The term "compression unit" is also often referred to as a "compressor." In this specification, the term "compressor system" is generally used throughout, as the actual compressor usually interacts directly with other components, such as a drive unit driving the compressor (e.g., an electric motor) and a lubricant reservoir.

From the evaporation unit, the working medium transformed from the liquid to the gaseous state is sucked in by the compressor and compressed to a pressure level that is required to liquefy the working medium. While the (for example, electrically) driven compressor compresses the vaporous working medium from a low outlet pressure level to a higher final pressure level, the temperature of the working medium increases. There are various compressor variants, for example, reciprocating compressors, scroll compressors, screw compressors, rotary compressors and rotary compressors (this list is not exhaustive). Reciprocating compressors, for example, are based on the principle that a moving piston sucks in the gaseous working medium through a suction valve when the piston moves downwards into a cylinder surrounding the piston. The working medium is compressed when the piston experiences an upward movement. In reciprocating compressors, the intake valve is closed during compression of the working medium. The working medium leaves the compressor via a pressure valve if the pressure in the cylinder exceeds a pressure level present on a high-pressure side of the compressor.

Such compressors/compressor systems can include a lubricant reservoir for holding a lubricant. Lubricant reservoirs are often referred to as "oil sumps." However, because lubricants other than oil can be used, the term "lubricant reservoir" is used herein. The lubricant is used to lubricate components of the compressor or compressor system, e.g., the moving components of the compressor (e.g., pistons, cylinders, bearings, valves, etc.). The oil or lubricant is sucked in from the oil sump or lubricant reservoir and transported to the respective points to be lubricated. As is known, the "lubricant" can include one lubricant or a mixture of lubricants.

It is known that, during standstill or shutoff of a heat pump, liquid working medium (e.g., refrigerant) can accumulate in the oil sump (lubricant reservoir) of the compressor and mix with the oil or lubricant, or gaseous working medium can dissolve into the oil or lubricant. As a result, the properties of the oil or lubricant can be changed. For example, the viscosity of the oil or lubricant can be reduced, and the lubricating effect can be reduced. If, instead of the oil or lubricant, a mixture of oil or lubricant and working medium is conveyed to the areas to be lubricated; this can lead to a reduced lubricating effect. Ultimately, this can result in increased friction between the moving components or in the bearings, which can lead to increased mechanical wear. In order to counteract this, oil or lubricant heaters are used to decrease viscosity, with which the lubricant can be heated when the heat pump is at a standstill. Typically, such heating systems use electric heating rods in the oil sump/lubricant reservoir, or electric heating strips surrounding the oil sump or the lubricant reservoir.

SUMMARY

The present invention in at least some embodiments addresses, inter alia, certain disadvantages of the aforementioned systems recognized by the present inventors. First, prior systems are unfavorable in terms of the life cycle assessment of a heat pump, as they require additional energy expenditure to provide the electrical energy required for the heating system. Furthermore, it is unfavorable that known systems require additional components that must be implemented separately in the system during design or assembly, which leads to an increased design or assembly effort and costs. In addition, particularly for high-temperature heat pumps, it can be necessary to cool the lubricant due to the high suction and compressed gas temperatures prevailing there, as well as the additional friction-induced heat generated in the compressor. This is not feasible with the prior systems.

Accordingly, at least some embodiments seek to provide a lubricant reservoir for a compressor system of a heat pump, a compressor system and a heat pump, whereby, in comparison with prior systems, an improved life cycle can be achieved, the manufacturing or assembly effort can be reduced, and/or both lubricant heating and cooling is possible.

At least some embodiments include a holding chamber for lubricant comprising at least one holding-chamber cladding element that at least partially outwardly limits the holding chamber. Furthermore, at least some embodiments relate to a compressor system for a heat pump, e.g., a high-temperature heat pump. Furthermore, at least some embodiments relate, for example, a high-temperature heat pump, comprising such a compressor system.

At least some embodiments include a lubricant reservoir for a compressor system of a heat pump, e.g., a high-temperature heat pump, comprising a holding chamber for lubricant comprising at least one holding-chamber cladding that at least partially outwardly limits the holding chamber. The lubricant reservoir may include one or more temperature controllers integrated into the holding-chamber cladding element and/or arranged on it, wherein a heating and/or cooling medium can flow through the temperature-control element.

As mentioned, by lubricant, both a single-component lubricant as well as a multi-component lubricant (i.e., a lubricant mixture) are contemplated. Furthermore, a lubricant can be a lubricating oil, but also another type of lubricant.

A holding chamber is an at least partially geometrically limited space in which a lubricant is or can be held. The holding chamber is at least partially outwardly limited by a holding-chamber cladding element, for example, a holding-chamber floor (or holding chamber ground) or a holding-chamber wall. The holding chamber can be formed from a plurality of holding-chamber cladding elements that are connected to each other (e.g., via corresponding welded joints). Also, the holding chamber can be outwardly limited by a holding-chamber cladding element formed as a single piece (this can be manufactured, for example, by casting or by way of a forging process). The terms "cladding" and "cladding element" are not to be understood in the sense of an external cladding or the like, but rather structure at least partially defining the reservoir and/or directly in contact with the lubricant receptive space limitation of the holding chamber.

The geometry of the holding-chamber cladding element is not fixed. For example, the holding chamber can have the shape of a tub, but also have a cylinder or silo-like shape, etc.—that is, any desired and suitable shape. In a cylinder-like shape of the holding chamber, for example, a cylinder shell can also be understood under a holding-chamber cladding element.

It should be understood that the temperature controller or temperature-control element can be located in or integrated into the solid material of the cladding element, i.e., surrounded by the solid material of the cladding element. In other embodiments, though, the temperature-control element(s) can be only partially connected to the holding-chamber cladding and/or project from a cladding element surface and, for example, project into the holding chamber.

It should be understood that "a heating and/or cooling medium can flow through temperature-control element" means that a heating medium can flow through the temperature-control element in a first operating mode (e.g., a heating mode), and, in a second operating mode (e.g., a cooling mode), a cooling medium can flow through the temperature-control element. That is, the temperature controller can provide a flow channel or flow chamber, which, depending on the operating mode, a heating or cooling medium flows through. This means that one and the same area has either a heating medium or a cooling medium flowing through it. In such an embodiment, either heating or cooling medium is supplied to the temperature-control element. The supply line separation may be carried out outside the temperature-control element. The same applies to the derivation. The temperature-control element can also comprise different supply and discharge lines for the heating medium or cooling medium. Furthermore, the temperature-control element can be formed in such a way that separate flow channels or flow chambers for the heating medium and cooling medium are formed in this. These separate flow channels or flow chambers then comprise separate supply and discharge lines for the heating medium or cooling medium. Indeed, they can have any suitable configuration as should be appreciated by those in the art.

Due to the fact that—depending on requirements—a heating or cooling medium can flow through the temperature-control element, lubricants located in the holding chamber can be heated or cooled flexibly, i.e., depending on the requirements at hand. Thus, the present invention is suitable for use in high-temperature heat pumps that may require cooling the lubricant. By integrating or arranging the temperature-control element in or on the at least one holding-chamber cladding element, the assembly effort in the construction or construction of the compressor system of a heat pump is simplified.

It should be understood that the invention is not to be limited to or constrained by particular embodiments described herein. For example, while the invention is described with respect to thermodynamic heating systems, such as heat pumps, such as, e.g., high-temperature heat pumps, the invention my be used with thermodynamic cooling systems, for example, a refrigerator or an air-conditioning systems. Further, it should be understood that the invention may be used with any suitable compressor system designs, including, but not limited to, open compressor systems, semi-hermetic compressor systems, or hermetic compressor systems. In open compressor systems, the drive unit (motor) may be structurally separated from the compressor. In such systems, the compressor drive shaft may extend out of the housing and connected to the drive unit. In semi-hermetic compressor systems, the drive unit and the compressor may be arranged in a common housing. In a hermetic compressor system, the drive unit and compressor may also be arranged in a common housing, but in contrast to a semi-hermetic compressor system, this is completely outwardly welded or otherwise sealed.

As mentioned above, the invention also contemplates a compressor system, for example, a compressor system for a heat pump, e.g., for a high-temperature heat pump, wherein the compressor system comprises a lubricant reservoir, such as, but not limited to, as described herein.

As mentioned above, the invention further contemplates a heat pump. The heat pump may be a high-temperature heat pump. The heat pump may comprise a compressor system such as, but not limited to, and have a supply and discharge system that is flow-connected to the temperature-control element. Such supply and discharge can feed the temperature controller with a heating or cooling medium that is supplied/discharged to the heat pump or an external heating or cooling medium.

Other details, features, objectives and advantages should be recognized by those skilled in the art, and in view of the following detailed description with reference to the Figures, which are understood not to be limiting. It should be noted that the features listed individually in the specification and claims can be combined in any manner to achieve further embodiments. It should also be noted that the term "and/or"

or similar used herein may be interpreted as covering both the conjunctive and disjunctive.

DETAILED DESCRIPTION

Figure 1:
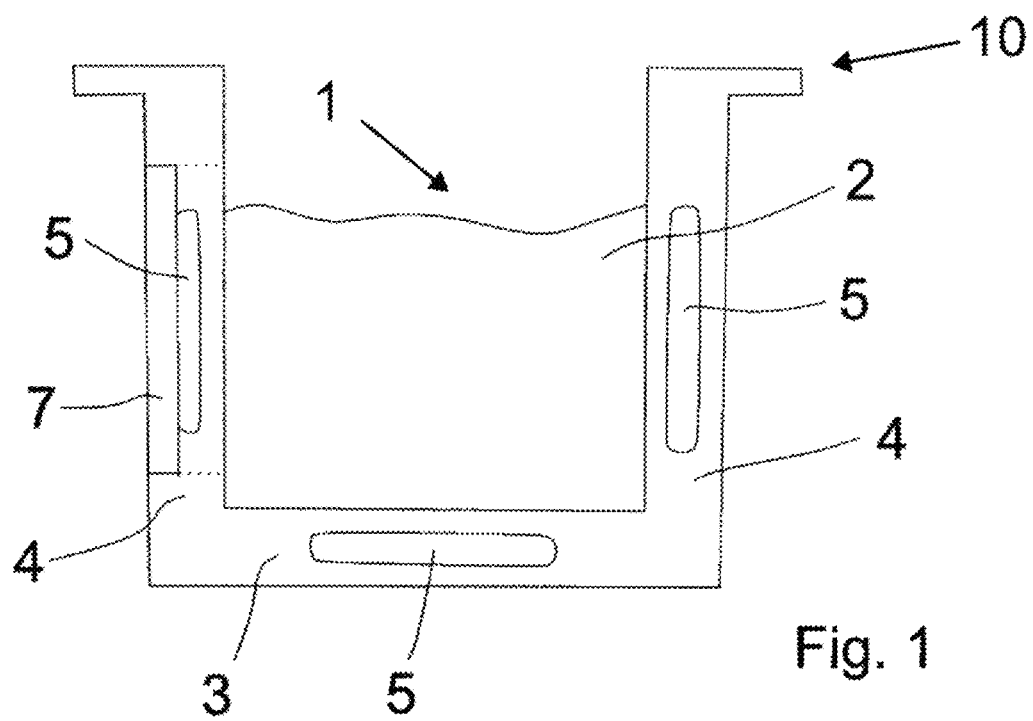
FIG. 1 is sectional view of a lubricant reservoir.

FIG. 1 shows a schematic sectional illustration of a lubricant reservoir 10 that may be used for a compressor system of a heat pump, such as, for example, a high-temperature heat pump. It can be seen that the lubricant reservoir 10 comprises a holding chamber 1 for lubricant 2. The holding chamber 1 is outwardly limited by holding-chamber cladding elements 3, 4. Here, the holding-chamber cladding element 3 is a holding-chamber floor; the holding-chamber cladding element 4 is a holding-chamber wall or a holding-chamber shell. Temperature controllers or temperature-control elements 5 are integrated with the holding-chamber cladding elements 3, 4. In this embodiment, the temperature controllers constitute cavity chambers or channels, though they may take other forms as those skilled in the art should appreciate. The temperature-control element 5 has a corresponding supply and discharge line (or lines) for flow of a heating or cooling medium through it. As shown in FIG. 1, the temperature-control element 5 is integrated on a holding-chamber cover 7 that closes a part of the lubricant reservoir 10 or the holding chamber 1. In practice, the lubricant reservoir 10 can comprise one or a plurality of temperature controllers 5, which can be arranged at different positions than those shown in FIG. 1.

Figure 2:
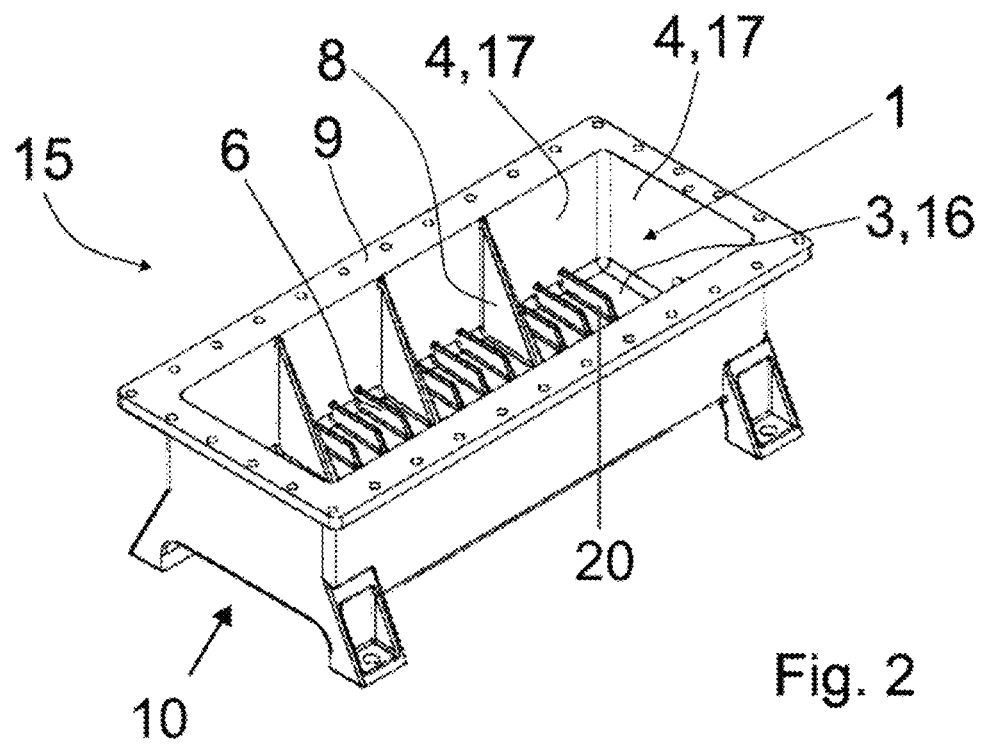
FIG. 2 is a perspective view of another lubricant reservoir.

In FIG. 2, another lubricant reservoir 10 is shown in a perspective view. In this embodiment, parts, portions or elements having the same reference numeral as parts, portions or elements in FIG. 1 constitute the same or a similar structure as in FIG. 1, except as may be specified. In this embodiment, the tub 15 comprises a tub floor 16 and tub walls or wall elements 17, which form the holding-chamber cladding elements 3, 4. Furthermore, the tub 15 forms the holding chamber 1. On the tub floor 16, a plurality of ribs 6 are arranged, which are designed in the form of channels. The heating or cooling medium can flow through these channels. Furthermore, a plurality of reinforcement structures 8, which in this embodiment are in the form of plates, are arranged in the tub 15 between the tub wall elements 17 and the tub floor 16, which increase the mechanical stability of the tub 15. The tub 15 also comprises a mounting flange 9, via which the tub can be connected to another part, such as a housing part of a compressor of a compressor system.

Figure 3:
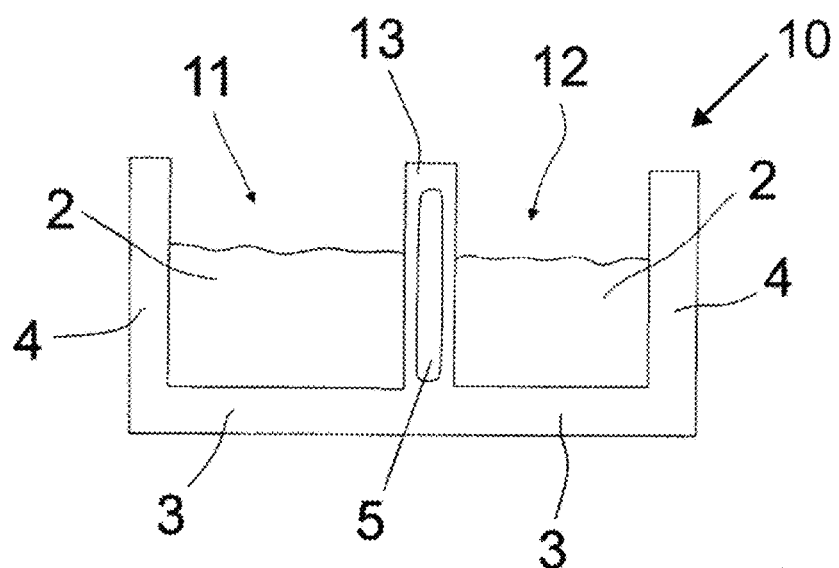
FIG. 3 is a sectional view of another lubricant reservoir.

FIG. 3 shows a schematic sectional illustration of another lubricant reservoir 10. In this embodiment, parts, portions or elements having the same reference numeral as parts, portions or elements in FIG. 1 and/or FIG. 1 constitute the same or a similar structure as therein, except as may be specified. In this embodiment, the lubricant reservoir 10 comprises a plurality of holding chambers or sub-chambers 11, 12 for holding lubricant 2. A first holding chamber 11 is directly adjacent to a second holding chamber 12. The first and second holding chambers 11, 12 are separated by an adjacent-area cladding 13, wherein a temperature controller 5 is integrated into the adjacent-area cladding 13. One of ordinary skill should appreciate that, while FIG. 3 shows only one temperature controller 5, the lubricant reservoir 10 may have multiple temperature controllers or temperature-control elements.

Figure 4:
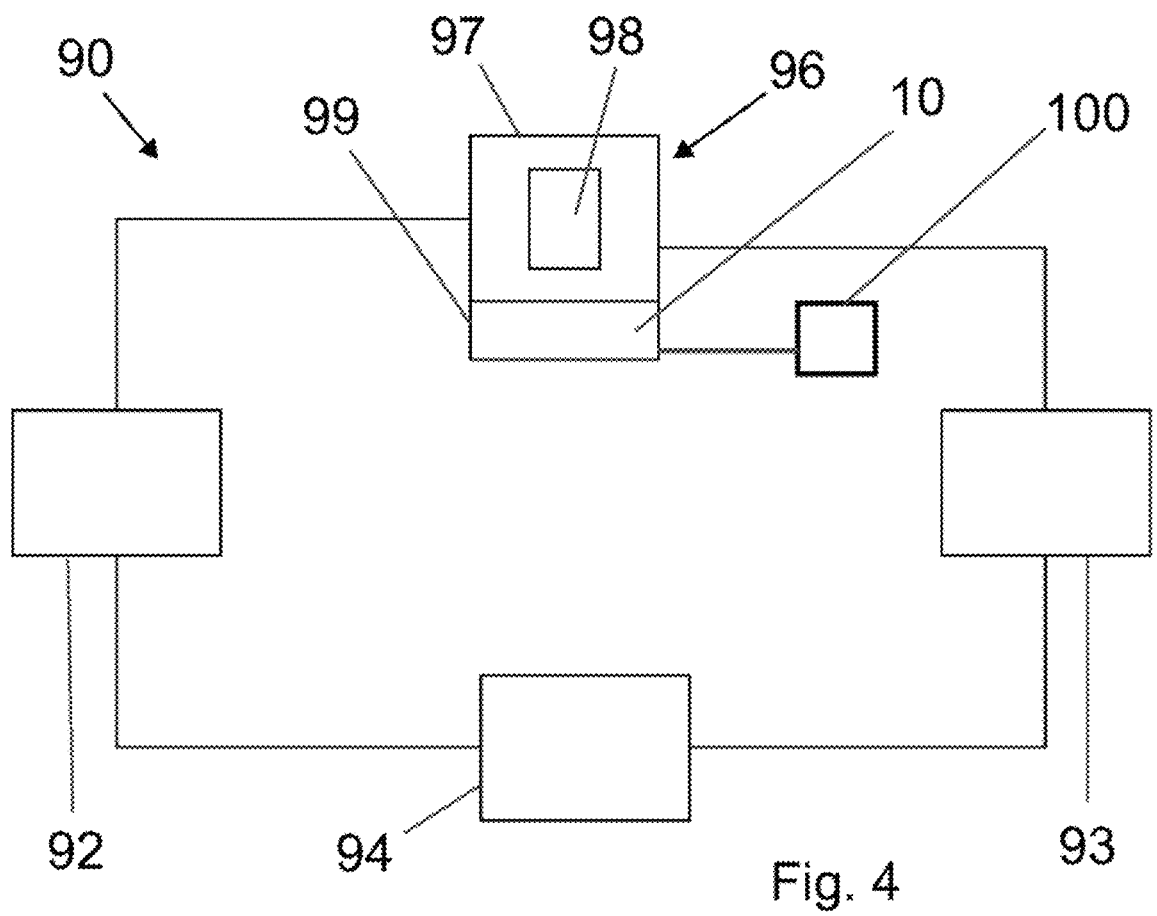
FIG. 4 schematically shows an embodiment of a high temperature heat pump.

FIG. 4 schematically shows an embodiment of a high temperature heat pump 90 including the lubricant reservoir 10. The high temperature heat pump 90 also includes an evaporator 92, a condenser 93, an expansion tank 94 and a compressor system 96. The compressor system 96 includes a compressor system housing 97 and a compressor 98 therein. In the illustrated embodiment, the lubricant reservoir 10 is formed in a housing part 99 of the compressor system housing 97. A supply and discharge 100 is flow-connected or flow-connectable to a temperature controller of the lubricant reservoir and configured to supply the temperature controller with (i) a heating or cooling medium supplied to or discharged from the heat pump or (ii) an external heating or cooling medium.

Further non-limiting embodiments are described below.

According to at least some embodiments, it can be provided in a lubricant reservoir that the holding-chamber cladding element is a holding-chamber floor, a holding-chamber wall, a holding-chamber shell or a holding-chamber cover. This can vary depending on the geometry of the holding chamber. In a tub shape of the holding chamber, for example, a plurality of holding-chamber cladding elements can limit the holding chamber, for example, a holding-chamber floor and a plurality of adjacent holding chamber subwalls, wherein the holding chamber subwalls form a common holding-chamber wall. In a cylindrical basic shape of the holding chamber, for example, the holding-chamber cladding element can also be formed by a holding-chamber shell. Accordingly, the temperature-control element can be arranged at different positions of the lubricant reservoir, for example, in a holding-chamber floor, a holding-chamber wall, a holding-chamber shell or a holding-chamber cover. Also, a plurality of temperature-control elements can be arranged in a holding-chamber cladding element or a plurality of holding-chamber cladding elements, for example, in the holding-chamber floor and a holding-chamber wall (or a plurality of holding chamber subwalls).

According to at least one further embodiment, the temperature-control element is a cavity chamber formed in the holding-chamber cladding. The heating and/or cooling medium can then flow through such a cavity chamber. The cavity chamber connects or is connectable to one or a plurality of suitable supply line(s) and discharge line(s) for the heating medium or cooling medium. The geometry of the cavity chamber is not fixed as long as the heating or cooling medium can flow through it. The cavity chamber can comprise a corrosion-inhibiting inner coating.

According to at least one further embodiment, the temperature-control element is designed as an arrangement integrated into the holding-chamber cladding element, said arrangement comprising a plurality of cavity chambers that are flow-connected to each other or separated from each other with regard to flow. By means of flow-connected cavity chambers, the temperature distribution during cooling or heating of the lubricant over the surface of a cladding can be optimized. In the case of separately formed (separated from each other with regard to flow) cavity chambers, a surface-optimized cooling of the lubricant can also take place. Furthermore, a selective flow through individual chambers of a cladding element is possible, which can lead to an even more flexible temperature setting in the holding chamber. It can therefore be flexibly adjusted with regard to a holding-chamber cladding element whether a cooling or heating medium should flow through a certain cavity chamber (provided there) or not.

According to at least one further embodiment, the temperature controller defines a channel formed on the holding-chamber cladding element and the cooling or heating medium can flow through it. The channel at least partially projects into the holding chamber and is separated from the holding chamber by a channel wall 20. By projecting such a channel into the holding chamber, an improved heat transfer (be it heat input during heating or heat dissipation during cooling) can take place between the lubricant and the temperature-control element.

According to at least one further embodiment, the channel is designed in the form of a rib that at least partially projects into the holding chamber. A rib-like formation can further increase heat transfer, and, where applicable, increase the mechanical stability of the holding chamber or the holding-chamber cladding elements. A holding-chamber cladding element can comprise a plurality of such ribs. Also, a plurality of holding-chamber cladding elements that limit the holding chamber can comprise one or a plurality of ribs. It should be understood that a combined arrangement of one or a plurality of ribs provided in a holding-chamber cladding element and a cavity chamber arranged in a further holding-chamber cladding element or at another position of the holding-chamber cladding element is also possible.

According to at least one further embodiment, the temperature-control element is designed as an arrangement formed on the cladding element, said arrangement comprising a plurality of channels, each of which projects at least partially into the holding chamber, wherein the channels are flow-connected to each other or separated from each other with regard to flow. The channels can each be designed as a rib. Via flow-connected channels, the temperature distribution during cooling or heating of the lubricant over the surface of a cladding element can be increased. In the case of separately formed chambers (separated from each other with regard to flow), a surface-optimized cooling of the lubricant can also take place. Furthermore, a selective flow through individual channels of a cladding element is possible, which can lead to an even more flexible temperature setting in the holding chamber. It can therefore be flexibly adjusted with regard to a holding-chamber cladding element whether a cooling or heating medium should flow through a certain channel (provided there) or not.

According to at least one further embodiment, a plurality of holding chambers for the lubricant can be provided in the lubricant reservoir, wherein at least one first holding chamber is directly adjacent to a second holding chamber, and the first and second holding chamber in the adjacent region are separated from each other by an adjacent-area cladding, wherein the temperature-control element in the adjacent-area cladding element is integrated and/or arranged on it. Thus, a temperature controller can be arranged between different holding chambers and heat the lubricants arranged therein at the same time or dissipate heat from them (cool). Similar or different lubricants can be accommodated in different holding chambers.

According to at least one further embodiment, the temperature-control element can be fed via an external media circuit or via a plurality of external media circuits with the heating or cooling medium. An "external media circuit" can be understood as a supply of the temperature-control element with heating medium or cooling medium, which originates from an externally arranged source (i.e., outside the compressor or the heat pump). The temperature-control element can have a suitable supply and discharge lines for this purpose.

According to at least one further embodiment, the temperature-control element is designed to be fed via a supply and discharge unit of the compressor system including lubricant reservoir comprising heat pump with the heating or cooling medium. In this variant as well, the temperature-control element comprises suitable supply and discharge lines. In such an embodiment, a heating medium fed into the heat pump and having a certain temperature (this transfers heat to the working medium of the heat pump in the evaporator) can also be fed to the temperature-control element(s) and used to heat the lubricant. The same also applies to a medium that absorbs heat in the condenser of the heat pump. This medium can also serve as a heating medium and be fed to the temperature-control element(s). This means that media already used in the heat pump can also be used to heat the lubricant simultaneously, which has a positive effect on the life cycle assessment of the overall system.

Also, a combined (demand-oriented) approach from a supply of the temperature-control element or the temperature-control elements from one or a plurality of external media circuits and the supply via a medium introduced into the heat pump (e.g., the evaporator or the condenser) can be provided. A supply or discharge system to the temperature-control element(s) can comprise corresponding branches to make such an embodiment possible.

According to at least one further embodiment, the heating or cooling medium is water. Water can be handled in a particularly simple and harmless way and is particularly cost-effective. The temperature of water can be precisely set quickly and precisely.

According to at least one further embodiment, the holding chamber is formed in a housing part of a compressor-system housing accommodating a compressor of the compressor system. In this case, the compressor housing simultaneously forms the holding chamber or separates it from the outside. Accordingly, a housing wall provided in the area of the holding chamber, a housing floor or a housing shell of the compressor housing forms a holding-chamber cladding element, in which a temperature-control element can be integrated or on which a temperature-control element can be arranged.

According to at least one further embodiment, the housing part is a single-piece component of the compressor-system housing.

According to at least one further embodiment, the holding chamber is formed by a separate housing, which can be connected to the compressor-system housing accommodating the compressor. Such a connection can be implemented, for example, via screw connections, riveted connections or the like. Such a (detachable) attachment allows the ability to replace, maintain or repair the housing forming the holding chamber in the event of damage or maintenance.

According to at least one further embodiment, the housing part or the housing is a tub, wherein the tub is outwardly limited by a tub floor and wall elements as holding-chamber elements. In some such embodiments, in the area of the tub floor, a plurality of channel-like ribs is arranged as temperature-control elements. The tub can be connected to a housing (part) of the compressor system, e.g., via suitable screw connections. For this purpose, the tub can comprise a mounting flange.

As should be understood to those of ordinary skill in the art, the description herein is not intended to disclose all possible embodiments of the invention and combinations of features thereof, and this description should not be interpreted to apply only to the specific exemplary apparatuses described herein or the exemplary methods described herein, or exemplary combination of features. That is, the inventors expressly contemplate that the invention includes any combination or sub-combination of features described herein, regardless of whether such are explicitly described or shown herein.

As may be recognized by those of ordinary skill in the pertinent art based on the teachings herein, numerous changes and modifications may be made to the above-described and other embodiments in the present disclosure without departing from the spirit of the invention as defined in the claims. Accordingly, this detailed description of embodiments is to be taken in an illustrative, as opposed to a limiting sense.

What is claimed is:

1. An apparatus comprising:
a heat pump comprising a compressor system for a heat pump including
a lubricant reservoir comprising
a holding-chamber cladding at least partially defining a holding chamber configured to contain lubricant therein, wherein the holding-chamber cladding comprises a holding-chamber floor and a holding-chamber wall, wherein the holding chamber is formed in a housing part of a compressor system housing accommodating a compressor of the compressor system; and
temperature controller the holding-chamber floor, wherein the temperature controller is configured to receive and flow therethrough a heating and/or cooling medium;
wherein the temperature controller defines a plurality of channels, wherein each of the plurality of channels projects at least partially into the holding chamber and is separated from the holding chamber by a channel wall, wherein the channels are configured to receive and flow therethrough the heating and/or cooling medium, and
wherein the plurality of channels are (i) flow-connected to one another or (ii) are separated from each other with regard to flow; and
at least one supply and discharge flow-connected or flow-connectable to the temperature controller and configured to supply the temperature controller with (i) a heating or cooling medium supplied to or discharged from the heat pump or (ii) an external heating or cooling medium.

2. An apparatus according to claim 1, wherein the heat pump is configured to use media having temperatures of >100° C.

3. An apparatus according to claim 1, wherein the heat pump is configured to provide heat at temperatures higher than 70° C.

* * * * *